(12) United States Patent
Harris

(10) Patent No.: US 7,960,064 B2
(45) Date of Patent: *Jun. 14, 2011

(54) RAPID LIGHT-OFF CATALYTIC COMBUSTOR FOR FUEL CELL VEHICLE

(75) Inventor: Daniel I. Harris, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/912,939

(22) Filed: Oct. 27, 2010

(65) Prior Publication Data

US 2011/0039168 A1 Feb. 17, 2011

Related U.S. Application Data

(63) Continuation of application No. 11/684,349, filed on Mar. 9, 2007, now Pat. No. 7,858,255.

(51) Int. Cl.
*H01M 8/04* (2006.01)

(52) U.S. Cl. .................. 429/434; 429/436; 429/439

(58) Field of Classification Search .................. 429/434
See application file for complete search history.

(56) References Cited

U.S. PATENT DOCUMENTS

| | | |
|---|---|---|
| 5,922,485 A | 7/1999 | Enami |
| 6,232,005 B1 | 5/2001 | Pettit |
| 7,135,245 B2 | 11/2006 | Standke et al. |
| 2002/0142208 A1* | 10/2002 | Keefer et al. .................. 429/34 |
| 2002/0192515 A1 | 12/2002 | Bachinger et al. |
| 2003/0129462 A1 | 7/2003 | Yang et al. |
| 2003/0143448 A1 | 7/2003 | Keefer |
| 2005/0123813 A1 | 6/2005 | Matoba et al. |
| 2007/0134138 A1 | 6/2007 | Matsuo et al. |
| 2007/0287059 A1 | 12/2007 | Eickhoff et al. |

* cited by examiner

*Primary Examiner* — Ula C Ruddock
*Assistant Examiner* — Jacob Marks
(74) *Attorney, Agent, or Firm* — Fraser Clemens Martin & Miller LLC; J. Douglas Miller

(57) ABSTRACT

A catalytic combustion unit for a fuel cell system is provided. The catalytic combustion unit includes a reactor having a porous medium with a catalyst deposited thereon. The reactor is disposed adjacent a heat exchanger and adapted to receive an air stream and a hydrogen stream. The reactor is further adapted to promote an exothermic reaction and modulate a temperature of a fuel cell stack. A fuel cell system and method employing the catalytic combustion unit are also provided.

20 Claims, 3 Drawing Sheets

RAPID LIGHT-OFF CATALYTIC COMBUSTOR FOR FUEL CELL VEHICLE

CROSS-REFERENCE TO RELATED APPLICATIONS

This application is a continuation of U.S. patent application Ser. No. 11/684,349 filed on Mar. 9, 2007. The entire disclosure of the above application is hereby incorporated herein by reference.

FIELD OF THE INVENTION

The present disclosure relates to fuel cell systems and, more particularly, to a catalytic combustion unit for vehicles employing fuel cell systems.

BACKGROUND OF THE INVENTION

Fuel cells have been proposed as a clean, efficient and environmentally responsible power source for electric vehicles and various other applications. One example of a fuel cell is the Proton Exchange Membrane (PEM) fuel cell. The PEM fuel cell has a membrane-electrode-assembly (MEA) that generally includes a thin, solid polymer membrane-electrolyte having an electrode having a catalyst on both faces of the membrane-electrolyte.

The MEA generally includes porous conductive materials, also known as gas diffusion media (GDM), which distribute reactant gases to the anode and cathode electrode layers including a finely divided catalyst supported on carbon particles and admixed with a proton conductive resin. The catalyst is typically a precious metal, for example, platinum. Fuel, such as hydrogen gas, is introduced at the anode where it reacts electrochemically in the presence of the catalyst to produce electrons and protons. The electrons are conducted from the anode to the cathode through an electrical circuit disposed therebetween. Simultaneously, the protons pass through the electrolyte to the cathode where an oxidant, such as oxygen or air, reacts electrochemically in the presence of the electrolyte and catalyst to produce oxygen anions. The oxygen anions react with the protons to form water as a reaction product.

The MEA is generally interposed between a pair of electrically conductive contact elements or bipolar plates to complete a single PEM fuel cell. Individual PEM fuel cells are typically connected in series, or stacked one on top of the other, to form what is referred to as a fuel cell stack. The quantity and type of fuel cells in a fuel cell stack may be selected to provide a fuel cell stack capable of providing a desired amount of electricity, for example, an amount of electricity sufficient to power an automotive vehicle.

At sub-freezing temperatures, e.g. temperatures below 0° C., starting the fuel cell stack is known to be more difficult than starting the fuel cell stack at higher temperatures, e.g. 25° C. Frozen water forms in the fuel cell stack at sub-freezing temperatures and may inhibit the flow of reactants through the fuel cell stack. Additionally, the ionic conductivity of the MEA is significantly reduced at sub-freezing temperatures.

To overcome the difficulties associated with starting a fuel cell stack in sub-freezing temperatures, it is known to provide supplemental heating. For example, electrical heaters have been employed to heat a coolant fluid, which is subsequently circulated through the fuel cell stack. However the addition of an effective electrical heater to the coolant system adds undesirable mass and volume to the fuel cell system.

Current practices also include adding heat to a fuel cell power system by exothermically reacting hydrogen with cathode air on the MEA cathodes of the fuel cell stack. However, cathode catalysts in PEM fuel cells are typically not optimized for hydrogen combustion at low temperatures, and the long term use of catalytic combustion of hydrogen and air on the cathode may affect the durability of the catalyst and catalyst support materials. As reported by Standke et al. in U.S. Pat. No. 7,135,245, a separate catalytic combustor is also known that lies adjacent to a fuel cell stack and includes a series of catalyst coated flow channels. The catalytic combustor may radiate heat to the fuel cell stack or circulate hot exhaust gas around the fuel cell stack.

Emissions from catalyst combustion can undesirably include uncombusted hydrogen. To minimize hydrogen emissions, catalytic combustion systems desirably have a rapid "light-off." As used herein, the term "light-off" refers to a rate at which the catalyst reaches a temperature where the rate of reaction on the catalyst surface becomes diffusion-limited instead of kinetics-limited. At light-off, the catalyst combustion of hydrogen and oxygen occurs rapidly. With a rapid light-off, the catalyst rapidly heats to the light-off temperature. However, the presence of water on the catalyst of the catalytic combustor is known to be detrimental to light-off of combustion catalysts. Water acts to cool the catalyst surface and reduce a surface area of the catalyst available for reaction.

There is a continuing need for a fuel cell system that provides supplemental heating of a fuel cell stack that improves low temperature performance and start time of a vehicle employing the fuel cell stack without relying on power from the fuel cell stack. A system that improves a reliability of the fuel cell stack by providing supplemental heating, as well as removing exothermal hydrogen-air reactions from the cathode of the fuel cell stack and reduces hydrogen emissions, is also desired.

SUMMARY OF THE INVENTION

In concordance with the instant disclosure, a fuel cell system that provides supplemental heating of a fuel cell stack, improves low temperature performance and start times, reduces hydrogen emissions, and does not rely on power from the fuel cell stack is surprisingly discovered.

In one embodiment, a catalytic combustion unit for a fuel cell system is provided. The catalytic combustion unit includes a reactor having a porous medium with a catalyst deposited thereon. The reactor is disposed adjacent a heat exchanger and adapted to receive an air stream and a hydrogen stream. The reactor is further adapted to promote an exothermic reaction and modulate a temperature of a fuel cell stack.

In a further embodiment, a fuel cell system is provided including a fuel cell stack, an oxygen source adapted to provide a supply of oxygen to the fuel cell system, a hydrogen source adapted to provide a supply of hydrogen to the fuel cell system, and the catalytic combustion unit. The catalytic combustion unit is in fluid communication with the oxygen source and the hydrogen source and in heat exchange relationship with fuel cell stack. The catalytic combustion unit is also adapted to receive the supply of oxygen and hydrogen.

In another embodiment, a method for operating the fuel cell stack is provided. The method includes the steps of providing the catalytic combustion unit; supplying an air stream to the reactor; supplying a hydrogen stream to the reactor, wherein the hydrogen is oxidized in an exothermic reaction to generate a heated air stream; and transferring a quantity of heat from the heated air stream to the fuel cell stack to form a cooled air stream. The temperature of the fuel cell stack is thereby modulated and an accumulation of water in the reactor is militated against.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
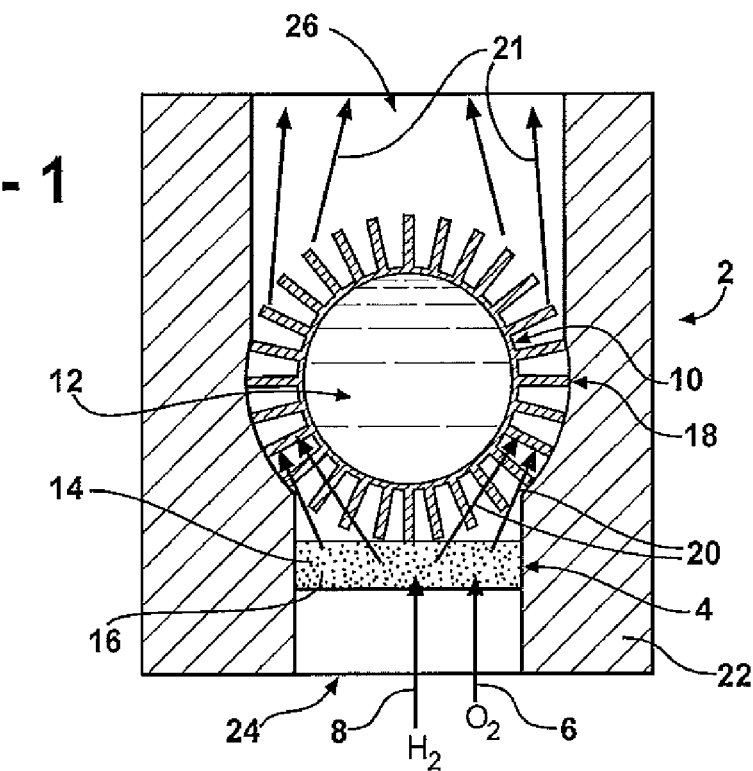
FIG. 1 is a cross-section of a side elevational view of a catalytic combustion unit according to an embodiment of the present invention.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

FIG. 1 depicts an illustrative catalytic combustion unit 2 according to an embodiment of the present disclosure. The catalytic combustion unit 2 includes a reactor 4 adapted to receive an oxygen stream 6, e.g. from an oxygen tank or from air, and a hydrogen stream 8, e.g. from a hydrogen tank or a reformate stream, and to promote an exothermic reaction. It should be appreciated that the oxygen stream 6 and the hydrogen stream 8 maybe provided as discrete feed streams or as a mixture of the oxygen stream 6 and the hydrogen stream 8 as desired. The reactor is disposed adjacent a heat exchanger 10 configured for a heat transfer fluid 12, also known as a coolant, to flow therethrough. The reactor 4 is typically disposed in the catalytic combustion unit 2 before the heat exchanger 10 to substantially avoid a moisture or humidity that may be present at the heat exchanger 10. The heat exchanger 10 is further adapted to transfer a quantity of heat generated by the reactor 4 to the heat transfer fluid 12.

The reactor 4 includes a porous medium 14 having a catalyst 16 deposited thereon. The porous medium 14 has a geometry selected to optimize the effectiveness of the catalyst 16 and a thermal mass of the catalytic combustion unit 2. In particular embodiments, the porous medium 14 is at least one of a screen, a mesh, and a foam. Other porous geometries may be used as desired. A material suitable for use as the porous medium 14 includes, for example, at least one of a metal and a ceramic. In one embodiment, the porous medium 14 is a stack of fine metallic screens having openings being about 0.001 inch to about 0.010 inch in diameter. The openings of each screen may be offset from the openings of adjacent screens to provide a tortuous path for the oxygen stream 6 and the hydrogen stream 8 to travel through. In a further embodiment, the porous medium 14 is ceramic foam, e.g. a silicon carbide foam. As a nonlimiting example, the porous medium 14 has a porosity profile of about 10 pores per lineal inch to about 80 pores per lineal inch. One of ordinary skill in the art should appreciate that other porous materials and porosity profiles may be used as desired.

The catalyst 16 deposited on the porous medium 14 includes catalysts known in the art for inducement of an exothermic oxidation reaction. In particular embodiments, the catalyst 16 includes a precious metal. As nonlimiting examples, the catalyst 16 is at least one of platinum, palladium, rhodium, iridium, osmium, silver, gold, and combinations thereof. It should be appreciated that the catalyst 16 may be substantially evenly distributed throughout the porous medium 14, thereby optimizing the effectiveness of the catalyst 16 in inducing the exothermic oxidation reaction. In further embodiments, the catalyst 16 is disposed at discrete interfaces between layers of the porous medium 14, for example.

In one embodiment, the catalytic combustion unit 2 includes a plurality of heat transfer fins 18 disposed adjacent the heat exchanger 10. In some embodiments, the heat transfer fins 18 substantially envelope the heat exchanger 10. The heat transfer fins 18 are adapted transfer a quantity of heat to the heat exchanger 10 from a heated air stream 20 generated by the reactor 4 in operation. A suitable heat exchanger 10 having a heat transfer core and a plurality of heat transfer fins 18 is available commercially as a unitary heat exchanger unit, for example, from Laminova AB of Stockholm, Sweden.

It should be appreciated that the heat transfer fins 18 provide an additional surface area for transfer of the heat from the heated air stream 20 as the heated air stream 20 flows over the heat transfer fins 18. Following a removal of at least a portion of the heat from the heated air stream 20 to form a cooled air stream 21 including a water byproduct, the cooled air stream 21 is used as a cathode inlet stream or exhausted, for example. It should be appreciated that the water byproduct produced by the exothermal oxidation reaction is carried away from the heat exchanger 10 and the reactor 4 by the heated and cooled air streams 20, 21

The reactor 4 and heat exchanger 10 are disposed in a housing 22. In particular embodiments, the housing 22 is formed from an insulating material. The housing 22 allows for a substantially adiabatic temperature increase when the reaction 4 is in operation, and militates against a thermal conduction and transfer of the heat to adjacent componentry (not shown). Suitable insulating materials, capable of withstanding the temperatures associated with the catalytic combustion unit of the present disclosure, may be selected as desired. As a nonlimiting example, suitable insulating materials are stable up to a temperature of about 650° K (about 375° C.).

The housing 22 includes at least one first aperture 24 disposed adjacent the reactor 4 and adapted for the reactant gases 6, 8 to flow therethrough to the reactor 4. The housing 22 includes at least one second aperture 26 disposed adjacent the heat exchanger 10 and adapted for the cooled air stream 21 to flow therethrough and away from the catalytic combustion unit 2.

Figure 2:
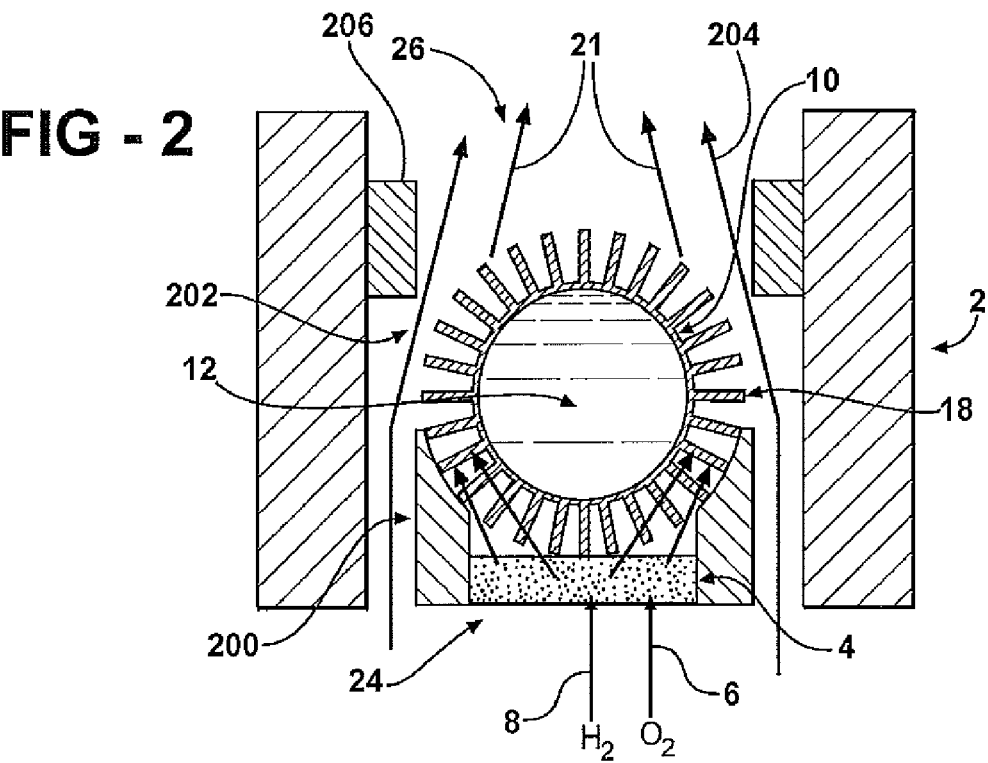
FIG. 2 is a cross-section of a side elevational view of the catalytic combustion unit of FIG. 1 incorporated into an illustrative catalytic combustion unit.

Referring now to FIG. 2, the reactor 4 may be disposed on a support member 200. The support member 200 is adapted to hold the reactor 4 and to allow a stream of reactant gases, e.g. the air and hydrogen streams 6, 8, to flow to the reactor 4. The support member 200 is also substantially stable at a range of temperatures generated by the exothermic oxidation reactions of the reactor 4 while in operation.

In a further embodiment, the catalytic combustion unit 2 includes an at least one bypass channel 202. The bypass channel 202 is disposed between the heat exchanger 10 and the housing 22, for example. The at least one bypass channel 202 is adapted to convectively cool the housing 22 when a fluid 204 flows therethrough. As a non-limiting example, the fluid 204 may include the oxygen stream 6, the hydrogen stream 8, or a mixture thereof. In a particular embodiment, the fluid 204 may include a mixture of the oxygen stream 6 and the hydrogen stream 8, wherein the hydrogen stream 8 is present at a concentration of less than about 4% by total volume of the mixture.

In an additional embodiment, the catalytic combustion unit 2 includes at least one seal 206 disposed at the second aperture 26. The seal 206 may be formed from an insulating material. The seal 206 is adapted to militate against an influx of water moisture to the reactor 4 when the reactor is not in operation. Furthermore, the seal 206 slows conduction of heat from the catalytic combustion unit 2 to other componentry (not shown) adjacent the catalytic combustion unit 2 that may be sensitive to the high temperatures produced by the exothermic oxidation reactions of the reactor 4.

As a nonlimiting example, the reactor 4 of the catalytic combustion unit 2 is adapted to provide an adiabatic temperature rise of about 80° K per percentage of hydrogen stream by total volume of the air stream and the hydrogen stream provided to the reactor. For example, it should be understood that for about 1% of hydrogen by volume injected into the reactor 4, an adiabatic temperature rise of about 80° K occurs. Similarly, for about 3% of hydrogen by volume injected into the reactor 4, an adiabatic temperature rise of about 240° K occurs. Thus, the heat produced by the catalytic combustion system can be selected as desired.

Figure 3:
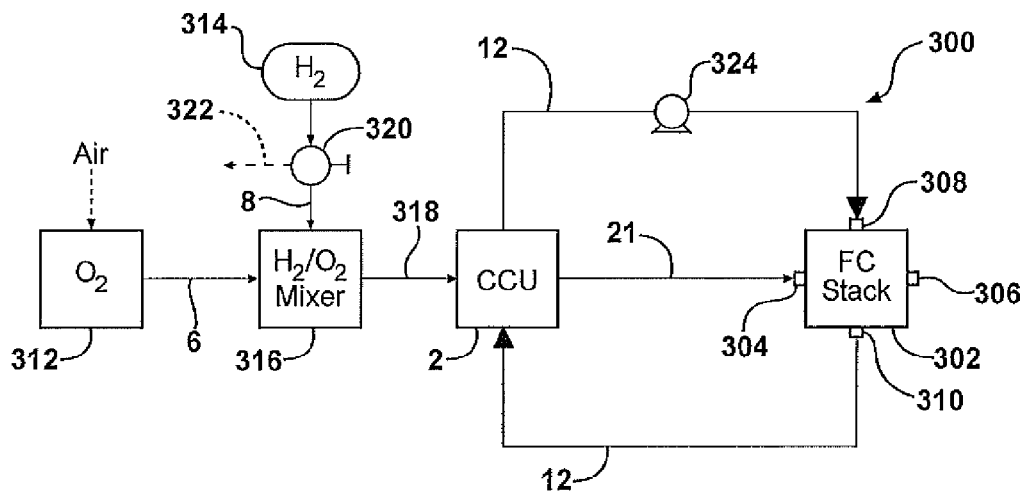
FIG. 3 is a schematic flow diagram of a fuel cell system including the catalytic combustion unit of FIGS. 1 and 2.
Figure 4:
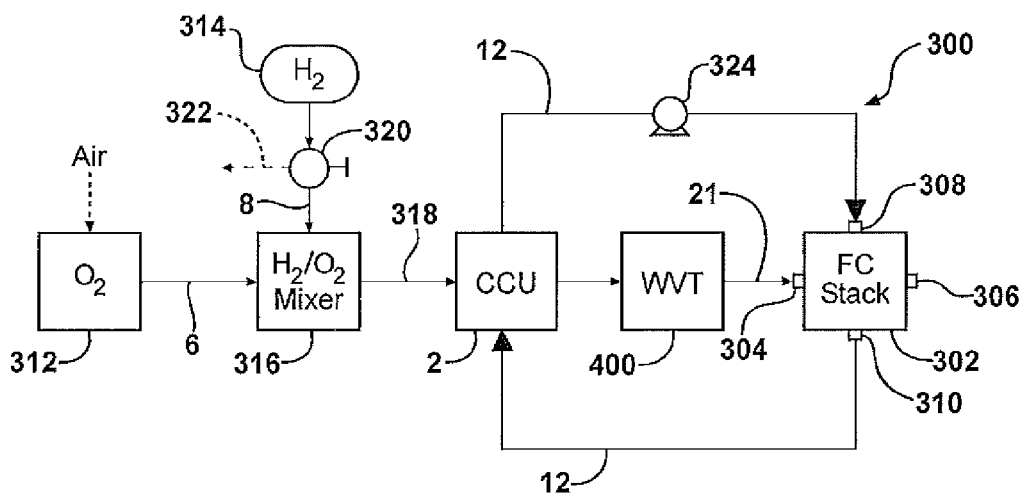
FIG. 4 is a schematic flow diagram of the fuel cell system of FIG. 3 including a water vapor transfer device.

Referring now to FIGS. 3 and 4, a fuel cell system 300 is provided having the catalytic combustion unit 2 of the disclosure. The fuel cell system 300 includes a fuel cell stack 302 having a plurality of fuel cells (not shown). The fuel cell stack 302 includes inlets and outlets known in the art, such as a cathode inlet 304 and a cathode outlet 306, an anode inlet (not shown) and an anode outlet (not shown), and a coolant inlet 308 and a coolant outlet 310, for example. It should be appreciated that the coolant inlet 308 and the coolant outlet, 310 are adapted for a heat transfer fluid to flow therethrough and circulate through the fuel cell stack 302, thereby modulating a temperature of the fuel cell stack 302.

The fuel cell system 300 includes an oxygen source 312 and a hydrogen source 314. The oxygen source 312 is adapted to provide a charged supply of oxygen, e.g. from air, to the catalytic combustion unit 2. In a particular embodiment, the oxygen source 312 is an air compressor. The hydrogen source 314 is adapted to provide a supply of hydrogen to the catalytic combustion unit 2. In further embodiments, the hydrogen source 314 is at least one of a hydrogen reservoir (e.g. a high pressure hydrogen tank), an anode exhaust stream having residual hydrogen, and a hydrogen-generating reformer. A skilled artisan should understand that other suitable oxygen and hydrogen sources 312, 314 may be used as desired.

The fuel cell system 300 further includes the catalytic combustion unit 2 of the present invention. The catalytic combustion unit 2 is in fluid communication with the oxygen source 312 and the hydrogen source 314. The catalytic combustion unit 2 is also in thermal communication with the fuel cell stack 302. For example, the catalytic combustion unit 2 is in a heat exchange relationship with the fuel cell stack 302. The reactor 4 of the catalytic combustion unit 2 is adapted to receive a supply of oxygen and hydrogen, for example from the oxygen and hydrogen sources 312, 314, and promote an exothermic reaction, whereby a temperature of the fuel cell stack is modulated. It should be appreciated that the heated generated by the catalytic combustion unit 2 may be used when the fuel cell stack is running at minimal power outputs, e.g. during a park phase, to maintain the temperature of the fuel cell stack above freezing (0° C.). The catalytic combustion unit 2 may also be used during a start-up phase to assist in raising the temperature of the fuel cell stack 302 to a desired operating temperature.

The oxygen source 312 and the hydrogen source 314 may feed directly to the catalytic combustion unit 2. In a particular embodiment, the oxygen source 312 and the hydrogen source 314 feed to a hydrogen-air mixer 316. The hydrogen-air mixer 316 is adapted to supply the catalytic combustion unit 2 with a desired hydrogen-air mixture 318. The fuel cell system may include a flow regulator 320 associated with the hydrogen source 314. In particular embodiments, the flow regulator 320 is a flow control valve. In another embodiment, the flow regulator 320 is a fuel injector. The flow regulator 320 is adapted to supply a desired amount of the hydrogen stream 8 to the hydrogen-air mixer 316, for further delivery at a particular ratio of oxygen to hydrogen to the catalytic combustion unit 2. In one embodiment, where the hydrogen source 314 includes an anode exhaust stream, the flow regulator 320 may divert a first portion of the anode exhaust stream to the hydrogen-air mixer 316 and a second portion of the anode exhaust stream 322 to a cathode exhaust stream. The second portion 322 is thus exhausted from the fuel cell system 300. In another embodiment, the flow regulator 320 is adapted to reduce or stop a flow of the hydrogen stream 8 as desired to avoid an excess heating of the catalytic combustor unit 2.

In a further embodiment of the present disclosure, the heat exchanger 10 of the catalytic combustion unit 2 is in fluid communication with the coolant inlet 308 of the fuel cell stack 302. A pump 324 is disposed between the catalytic combustion unit 2 and the fuel cell stack 302. The pump 324 is adapted to cause the heat exchange fluid 12 to flow through the coolant inlet 308 of the fuel cell stack 302, wherein the heat exchange fluid 12 is circulated throughout the fuel cell stack 302, for example through a plurality of coolant flow channels (not shown). The heat exchange fluid 12 is then forced by the pump 324 out of the coolant outlet 310 and back to the catalytic combustion unit 2 in a heat exchange loop. It should be understood that other pumping devices suitable for maintaining a flow of the heat exchange fluid 12 through the fuel cell stack 302 and the heat exchanger 10 may be used as desired.

With reference to FIG. 4, the fuel cell system 300 of the present invention may further include a water vapor transfer (WVT) device 400. The water vapor transfer device 400 is adapted to transfer water vapor from, for example, a water source (not shown). As a nonlimiting example, the water vapor transfer device 400 extracts water from a water carrying stream of the fuel cell system 300, e.g. from one of an anode and cathode exhaust stream and a reformate stream. The water vapor transfer device 400 may employ a water-transfer membrane, for example. In another nonlimiting example, the water vapor transfer device 400 transfers water vapor from a reservoir of liquid water. Suitable water vapor transfer devices 400 are known in the art and may be used as desired.

Figure 5:
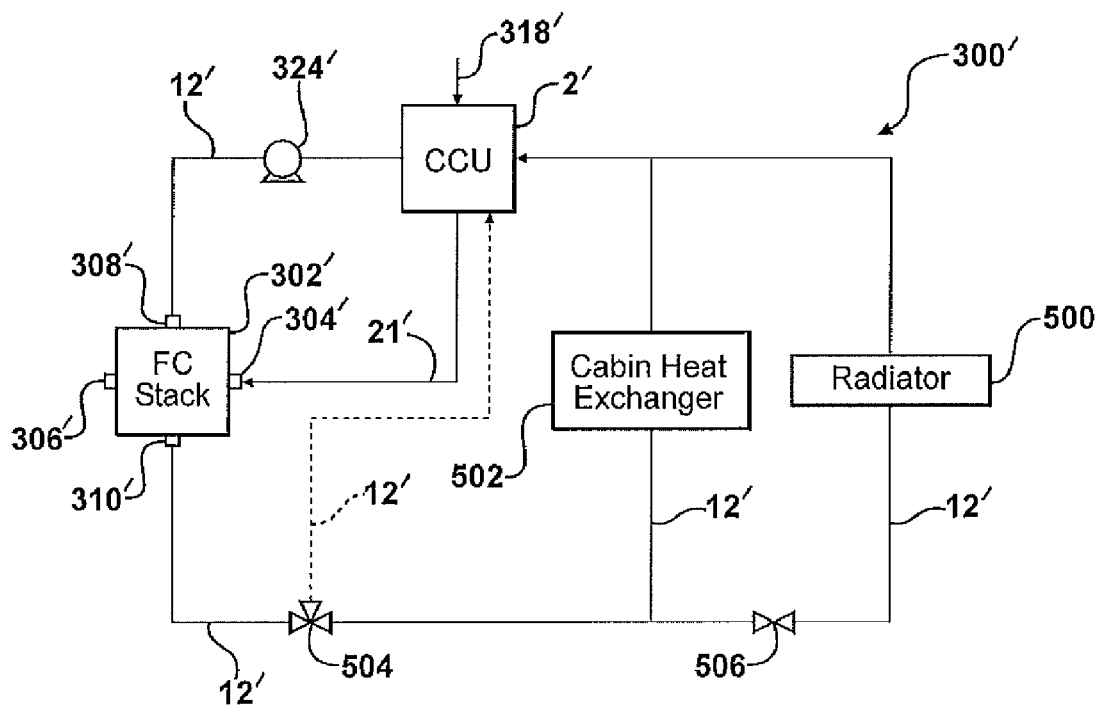
FIG. 5 is a schematic flow diagram of the fuel cell system of FIG. 3, having a first configuration including a radiator and a cabin heat exchanger.

A further embodiment of the present invention is shown in FIG. 5. Like structure from FIGS. 1 to 4 have the same reference numeral and a prime (') symbol. In a particular example, the fuel cell system 300' includes the catalytic combustion unit 2' in fluid communication with the fuel cell stack 302'. The fuel cell system 300' further includes a radiator 500 and a cabin heat exchanger 502 in fluid communication with the fuel cell stack 302' and the catalytic combustion unit 2'. It should be understood that any conventional heat exchanger may be used as the radiator 500 as desired. In certain embodiments, the cabin heat exchanger 502 includes a coolant loop (not shown) independent from the fuel cell stack 302'.

As a nonlimiting example, a pump 324' is adapted to cause a heat exchange fluid 12' to flow through the catalytic combustion unit 2' to the fuel cell stack 302'. The catalytic combustion unit 2' is adapted to receive a hydrogen-oxygen mixture 318', which is combusted to heat the heat exchange fluid 12'. The coolant inlet 308' is configured to received the heat exchange fluid 12', which then circulates through the fuel cell stack 302'. The coolant outlet 310' is adapted to exhaust the heat exchange fluid 12' from the fuel cell stack 302'. It should also be understood that the catalytic combustion unit 2' is adapted to supply a cooled air stream 21' to the cathode inlet 304' of the fuel cell stack 302', for example, as a cathode inlet stream.

The fuel cell system 300' has the catalytic combustion unit 2' disposed upstream of the fuel cell stack 302'. The fuel cell system 300' includes a bypass valve 504 disposed between and in communication with the coolant outlet 310' of the fuel cell stack 302' and the catalytic combustion unit 2'. The bypass valve 504' is adapted to direct a flow of the heat exchange fluid 12' to the catalytic combustion unit 2' and the cabin heat exchanger 502 and radiator 500 as desired. In particular embodiments, the bypass valve 504' directs the flow of heat exchange fluid 12' in response to a controller (not shown). As a nonlimiting example, when the temperature of the fuel cell stack 302' is below a desired value, the bypass valve 504' directs the heat exchange fluid 12' away from the cabin heat exchanger 502 and the radiator 500, thereby reserving a greater quantity of heat for the fuel cell stack 302'. As a further nonlimiting example, when the temperature of the fuel cell stack 302' is above a desired value, the bypass valve 504 directs the heat exchange fluid 12' to the cabin heat exchanger 502 and the radiator 500 prior to circulating the heat exchange fluid 12' to the catalytic combustion unit 2'. It should be appreciated that excess heat from the catalytic combustion unit 2' may thereby be employed to heat a cabin of a vehicle and radiated from the fuel cell system In one embodiment, the fuel cell system 300' includes a control valve 506 in communication with the radiator 500 and adapted to flow the heat exchange fluid 12' to the radiator 500 as desired. It should be appreciated that the control valve 506 may be actuated in response to the controller, and may be adapted to remove an excess of heat from the fuel cell system 300'.

Figure 6:
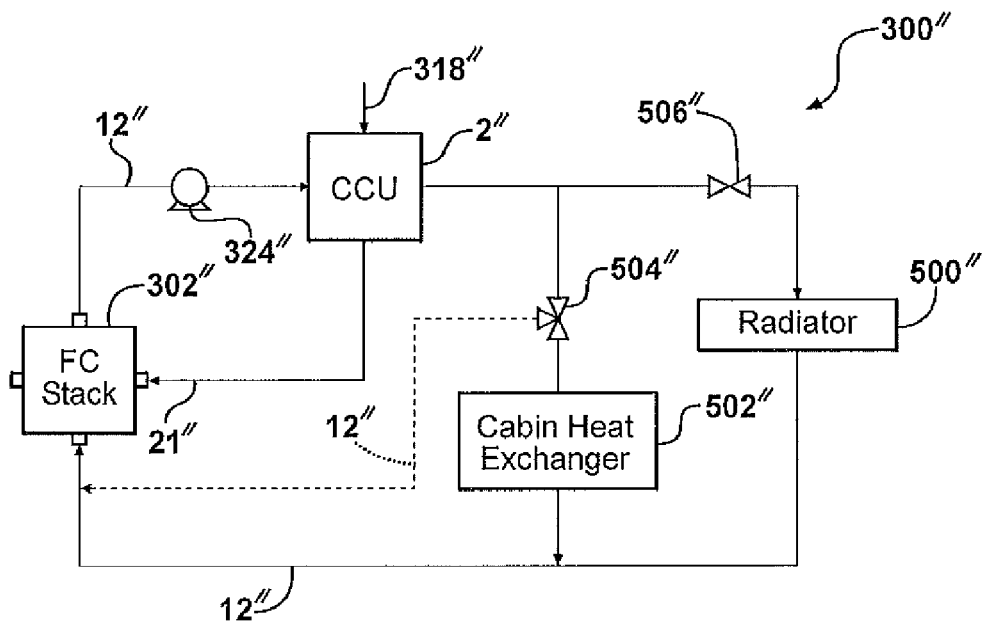
FIG. 6 is a schematic flow diagram of the fuel cell system of FIG. 3, having a second configuration including a radiator and a cabin heat exchanger.

Referring now to FIG. 6, a fuel cell system 300" is shown having the catalytic combustion unit 2" disposed downstream of the fuel cell stack 302". Like structure from FIGS. 1 to 5 have the same reference numeral and a double-prime (") symbol. As with the previous embodiments described, the catalytic combustion unit 2" receives a hydrogen-oxygen mixture 318". The hydrogen-oxygen mixture 318" is combusted to heat the heat exchange fluid 12". The heat exchange fluid 12" is pumped by the pump 324", for example, to the radiator 500" and the cabin exchange heater 502" after passing through the catalytic combustion unit 2". The bypass valve 504" is adapted to direct the heat exchange fluid 12" to either the cabin heat exchanger 502" or to the fuel cell stack 302" as desired. The control valve 506" is adapted to direct the heat exchange fluid 12" to the radiator 500" as desired. It should be appreciated that the bypass valve 504" and the control valve 506" may be controlled in conjunction with, for example, the controller.

The present disclosure further includes a method for operating the fuel cell stack 302, 302', 302". The method first includes providing the catalytic combustion unit 2, 2', 2" having the reactor 4 including the porous medium 14 with the catalyst 16 deposited thereon, the reactor 4 disposed adjacent the heat exchanger 10 and adapted to promote the exothermic reaction. The method further includes the steps of supplying the oxygen stream 6 and the hydrogen stream 8 to the reactor 4. The oxygen stream 6 and the hydrogen stream 8 may be independently supplied. In one embodiment, the oxygen and hydrogen streams 6, 8 are simultaneously supplied as the hydrogen-air mixture 318, 318', 318". The hydrogen-air mixture has up to about 4% hydrogen by total volume, for example. In a particular embodiment, the hydrogen air mixture has about 3% hydrogen by total volume.

At the reactor 4, the hydrogen is oxidized in the exothermic reaction to heat the non-reacted oxygen stream 6 and water byproduct, thereby generating the heated air stream 20. A quantity of heat from the heated air stream 20 is then transferred to the fuel cell stack 302, 302', 302". It should be appreciated that the transfer of heat produces the cooled air stream 21, which may be exhausted or fed to the fuel cell stack 302, 302', 302" as the cathode inlet stream. The cooled air stream 21, 21', 21" may have a temperature greater than a temperature of the fuel cell stack 302, 302', 302" even after the quantity of heat has been transferred to the heat transfer stream 12, 12', 12". Thus, in particular embodiments the cooled air stream 21, 21', 21" is employed to modulate the temperature of the fuel cell stack 302, 302', 302".

It should be appreciated that an accumulation of water in the reactor 4 is militated against using the system and method of the present disclosure. In particular, water accumulation is militated against by disposing the reactor 4 in the catalytic combustion unit 2, 2', 2" before the heat exchanger 10. Thus, a skilled artisan should understand that the catalytic combustion unit 2, 2', 2" is disposed at an optimal location within the fuel cell system 300, 300', 300" for maintaining the catalyst 16 substantially dry. Isolating the catalyst 16 from humidified gases allows for a rapid temperature rise internally for the catalyst 16 in operation, and thus a rapid light-off.

The method of the present disclosure may further include the step of flowing the heat transfer stream 12, 12', 12" through the heat exchanger 10, wherein a quantity of the heat generated by the exothermic reaction is transferred to the heat transfer stream 12, 12', 12". The heat transfer stream 12, 12', 12" is then supplied to the fuel cell stack 302, 302', 302". Upon circulation of the heat transfer stream 12, 12', 12" through the fuel cell stack 302, 302', 302", the temperature of the fuel cell stack 302, 302', 302" is modulated.

In an illustrative embodiment, the heat transfer stream 12 is supplied to at least one of the radiator 500, 500" and the cabin heat exchanger 502, 502" as desired. It should be appreciated that an excess quantity of heat produced by the catalytic combustion unit 2, 2', 2" may be used to heat a passenger cabin or other vehicle componentry. The excess quantity of heat may also be exhausted to an environment outside of the vehicle, for example, by circulating the heat transfer stream 12, 12', 12" having the excess heat to the radiator 500, 500".

In one embodiment, the method of the present disclosure includes circulating the cooled air stream 21, 21', 21" through the water vapor transfer device 400. The cooled air stream 21, 21', 21" is thereby humidified as desired. The cooled air stream 21, 21', 21" is then fed to the cathode inlet 304, for example. As a nonlimiting example, the cooled air stream 21, 21', 21" has from about 40% to about 60% relative humidity after circulating through the water vapor transfer device 400. In a particular example, the cooled air stream 21, 21', 21" has about 50% relative humidity after circulating through the water vapor transfer device 400.

In operation, it should be understood that a desired level of humidity of the cooled air stream 21, 21', 21" is selected based upon the operating conditions of the fuel cell stack 302, 302', 302". For example, during a cold start-up phase, e.g. in sub-zero conditions, the fuel cell stack 302, 302', 302" is cold enough that additional humidification is generally not required. In particular embodiments, the oxygen source 312 will ramp up the oxygen stream 6 to a maximum flow rate and the reactor 4 will heat to a desired operating temperature. At the maximum flow rate and the desired operating temperature, it should be understood that the heat output of the reactor 4 is limited by the volume ratio of hydrogen to oxygen being supplied to the reactor 4.

As a further nonlimiting example, when the fuel cell stack 302, 302', 302" has achieved a desired operating temperature, additional humidification may be required. The level of humidity is modulated by at least one of reducing the temperature of the fuel cell stack 302, 302', 302" and reducing the flow rate through the fuel cell stack 302, 302', 302", for example. Thus, in an embodiment having the water vapor transport device 400, it should be understood that the flow rate of the cooled air stream 21, 21', 21", may be selected based on a known efficiency or performance of the water vapor transport device 400 to provide the cooled air stream 21, 21', 21" having the desired humidity.

It has been surprisingly found that the catalytic combustion unit 2, and a fuel cell system 300, 300', 300" and method employing the catalytic combustion unit, optimize a low temperature performance of a fuel cell vehicle. Particularly, the catalytic combustion unit 2, 2', 2" has a rapid light-off and associated start time in cold or sub-zero conditions. The reactor 4, being disposed in a location that militates against an accumulation of water, has an optimized amount of catalyst available for reaction. Therefore, in operation the reactor 4 heats rapidly to light-off. Also, as the catalytic combustion unit 2, 2', 2" is disposed outside of the fuel cell stack 302, 302', 302" and thermally insulated, the catalytic combustion unit has an optimized thermal mass. The optimized thermal mass of the catalytic combustion unit 2, 2', 2" also facilitates the rapid light-off. The rapid light-off provided by the catalytic combustion unit 2, 2', 2" of the disclosure further optimizes emissions of uncombusted hydrogen, which occurs in typical catalytic combustions systems where the system does not quickly reach the light-off temperature.

Additionally, the method of the disclosure does not rely on a quantity of power from the fuel cell stack 302, 302', 302" or from a battery, for example, to operate. The fuel cell system of the disclosure also has an optimized durability. The exothermal reactions that systems of the art generally performed on the cathodes of the fuel cell stack 302, 302', 302" to generate heat are performed outside of the fuel cell stack 302, 302', 302" in the catalytic combustion unit 2, 2', 2". Thus, an additional degradation of the cathodes of the fuel cell stack 302, 302', 302" is militated against.

While certain representative embodiments and details have been shown for purposes of illustrating the invention, it will be apparent to those skilled in the art that various changes may be made without departing from the scope of the disclosure, which is further described in the following appended claims.

What is claimed is:

1. A catalytic combustion unit for a fuel cell system with a fuel cell stack, the catalytic combustion unit comprising:
    a housing with a first aperture and a second aperture and at least one fluid flow path from the first aperture to the second aperture, the first aperture receiving an inlet stream formed from an oxygen stream and a hydrogen stream;
    a heat exchanger disposed through the housing and including a hollow heat transfer core with a plurality of heat transfer fins disposed on an outer surface of the hollow heat transfer core, the heat transfer fins disposed inside the housing between the hollow heat transfer core and the housing, the hollow heat transfer core permitting a heat transfer fluid to flow therethrough;
    a reactor disposed inside of the housing between the first aperture of the housing and the heat exchanger, the reactor including a porous medium with a catalyst deposited thereon, the reactor disposed adjacent the heat exchanger and receiving the oxygen stream and the hydrogen stream from the first aperture, the reactor promoting an exothermic reaction in the presence of the inlet stream and converting the inlet stream into a heated outlet stream, wherein the heated outlet stream heats the heat transfer fluid as the heated outlet stream flows over the heat transfer fins, and the heated outlet stream is cooled to form a cooled outlet stream, the second aperture permitting the cooled outlet stream to flow therethrough and away from the housing, wherein the heat transfer fluid is circulated through the fuel cell stack, and wherein a temperature of the fuel cell stack is modulated by at least one of the cooled outlet stream and the heat transfer fluid.

2. The catalytic combustion unit of claim 1, wherein the housing is formed from an insulating material that militates against a transfer of heat through the housing.

3. The catalytic combustion unit of claim 1, wherein a first portion of the heat transfer fins abuts the housing.

4. The catalytic combustion unit of claim 1, wherein at least one bypass channel is disposed between the heat exchanger and the housing, the at least one bypass channel adapted to permit a fluid to flow therethrough to cool the housing, wherein a transfer of a heat from the catalytic combustion unit to the housing is militated against.

5. The catalytic combustion unit of claim 4, wherein at least one seal is disposed at the second aperture to militate against an influx of moisture to the reactor when the reactor is not in operation.

6. The catalytic combustion unit of claim 5, wherein the at least one seal is disposed inside of the housing, the at least one seal abutting the housing.

7. The catalytic combustion unit of claim 4, wherein the heat exchanger is positioned on a hollow support member disposed inside of the housing, the support member having the reactor disposed therein and permitting the oxygen stream and the hydrogen stream to flow to the reactor inside of the support member.

8. The catalytic combustion unit of claim 7, wherein the at least one bypass channel is also disposed between the support member and the housing.

9. The catalytic combustion unit of claim 8, wherein a second portion of the heat transfer fins abuts the reactor.

10. The catalytic combustion unit of claim 9, wherein a third portion of the heat transfer fins abuts the support member.

11. The catalytic combustion unit of claim 1, wherein the porous medium is formed from at least one of a screen, a mesh, and a foam.

12. The catalytic combustion unit of claim 11, wherein the porous medium is at least one of a metal and a ceramic.

13. The catalytic combustion unit of claim 1, wherein the reactor is adapted to provide an adiabatic temperature rise of about 80° K per percentage of hydrogen stream by total volume of the oxygen stream and the hydrogen stream provided to the reactor.

14. A fuel cell system, comprising:
a fuel cell stack having an anode inlet, a coolant inlet, and a cathode inlet;
an oxygen source adapted to provided an oxygen stream to the fuel cell system;
a hydrogen source adapted to provide a hydrogen stream to the fuel cell system; and
a catalytic combustion unit, the catalytic combustion unit including a housing with a first aperture and a second aperture and at least one fluid flow path from the first aperture to the second aperture, the first aperture receiving an inlet stream formed from the oxygen stream and the hydrogen stream, a heat exchanger disposed through the housing and including a hollow heat transfer core with a plurality of heat transfer fins disposed on an outer surface of the hollow heat transfer core, the heat transfer fins disposed inside the housing between the hollow heat transfer core and the housing, the hollow heat transfer core permitting a heat transfer fluid to flow therethrough, a reactor disposed inside of the housing between the first aperture of the housing and the heat exchanger, the reactor including a porous medium with a catalyst deposited thereon, the reactor disposed adjacent the heat exchanger and receiving the oxygen stream and the hydrogen stream from the first aperture, the reactor promoting an exothermic reaction in the presence of the inlet stream and converting the inlet stream into a heated outlet stream, wherein the heated outlet stream heats the heat transfer fluid as the heated outlet stream flows over the heat transfer fins, and the heated outlet stream is cooled to form a cooled outlet stream, the second aperture permitting the cooled outlet stream to flow therethrough and away from the housing, wherein the heat transfer fluid is circulated through the fuel cell stack, and wherein a temperature of the fuel cell stack is modulated by at least one of the cooled outlet stream and the heat transfer fluid.

15. The fuel cell system of claim 14, wherein the oxygen source is an air compressor.

16. The fuel cell system of claim 14, wherein the hydrogen source is at least one of an anode exhaust stream, a hydrogen reservoir, and a hydrogen-generating reformer.

17. The fuel cell system of claim 14, further comprising a water vapor transfer device in communication with the catalytic combustion unit and the cathode inlet of the fuel cell stack, the water vapor transfer device adapted to humidify a cathode feed stream.

18. A method for operating a fuel cell stack, comprising:
providing a catalytic combustion unit including a housing with a first aperture and a second aperture and at least one fluid flow path from the first aperture to the second aperture, the first aperture receiving an inlet stream formed from an oxygen stream and a hydrogen stream, a heat exchanger disposed through the housing and including a hollow heat transfer core with a plurality of heat transfer fins disposed on an outer surface of the hollow heat transfer core, the heat transfer fins disposed inside the housing between the hollow heat transfer core and the housing, the hollow heat transfer core permitting a heat transfer fluid to flow therethrough, a reactor disposed inside of the housing between the first aperture of the housing and the heat exchanger, the reactor including a porous medium with a catalyst deposited thereon, the reactor disposed adjacent the heat exchanger and receiving the oxygen stream and the hydrogen stream from the first aperture, the reactor promoting an exothermic reaction in the presence of the inlet stream and converting the inlet stream into a heated outlet stream, wherein the heated outlet stream heats the heat transfer fluid as the heated outlet stream flows over the heat transfer fins, and the heated outlet stream is cooled to form a cooled outlet stream, the second aperture permitting the cooled outlet stream to flow therethrough and away from the housing;
supplying the oxygen stream to the reactor;
supplying the hydrogen stream to the reactor, wherein the hydrogen is oxidized in the exothermic reaction to generate the heated air stream; and
transferring a quantity of heat from the heated outlet stream to the fuel cell stack by circulating the heat transfer fluid through the fuel cell stack, wherein a temperature of the fuel cell stack is modulated and an accumulation of water in the reactor is militated against.

19. The method of claim 18, further comprising the step of supplying the heat transfer fluid to at least one of a cabin heat exchanger and a radiator.

20. The method of claim 18, further comprising the step of supplying the cooled outlet stream to the cathode inlet of the fuel cell stack.

* * * * *